United States Patent Office 3,015,566
Patented Jan. 2, 1962

3,015,566
PROCESS FOR IMPROVING FRYING FATS AND
THE RESULTING COMPOSITION
Ewald Georg Becker, Hamburg-Bahrenfeld, and Theophil
Wieske, Hamburg-Grossflottbek, Germany, assignors
to Lever Brothers Company, New York, N.Y., a corporation of Maine
No Drawing. Filed Sept. 11, 1959, Ser. No. 839,300
Claims priority, application Great Britain Sept. 19, 1958
24 Claims. (Cl. 99—123)

This invention relates to food additives and particularly to the incorporation in foodstuffs comprising emulsions of water and fat and suitable for frying such, for example, as margarine, of certain surface-active substances.

Margarine is commonly used for frying. For this purpose it is desirable that the margarine shall not spatter at all or only very little, that it shall give a fine sediment, which does not adhere to the frying pan, and that it shall show an attractive golden-yellow colour after frying. These properties are not normally imparted by any of the usual constituents of margarine, such as fats and the mono- and diglycerides normally employed as emulsifiers. Additives such as lecithin and egg-yolk have a slight but insufficient effect in the desired direction. Various so-called anti-spattering agents have been proposed but have not been found satisfactory.

The present invention provides for the incorporation of a class of surface-active substances which are of particular value as additives to foodstuffs of the kind referred to above, such as margarine, especially for improving their frying properties. These substances are compounds, especially esters, containing only carbon, hydrogen, oxygen and, optionally, nitrogen, which simultaneously satisfy certain conditions specified hereafter:

(1) They contain either one to three (preferably one) free carboxylic acid groups, or one to two (preferably one) anhydride groups derived from two carboxylic acid groups and in addition zero to one free carboxylic acid groups, per molecule.

(2) They contain at least one carboxylic acid radical derived from a polycarboxylic acid, a hydroxycarboxylic acid or an aminocarboxylic acid, per molecule.

(3) They may contain up to three free hydrophilic groups other than carboxylic acid or anhydride groups, such as for example hydroxy and/or amino groups, per molecule, the number of such groups being at most equal to and preferably less than, the sum of the number of free carboxylic acid groups and the number of anhydride groups. In most cases it is preferred to have no free hydroxy or amino groups present.

(4) They contain at least two lipophilic groups, such as saturated or olefinically unsaturated aliphatic or cycloaliphatic hydrocarbon radicals or heterocyclic radicals containing only carbon and oxygen in the ring structure, containing from 6 to 30, and preferably from 12 to 22 carbon atoms, per molecule. The number of carbon atoms in each lipophilic group is preferably at least 16 when only two lipophilic groups are present and may be less when more than two lipophilic groups are present.

(5) The ratio between the total number of carbon atoms and the sum of the number of free carboxylic acid groups and the number of anhydride groups per molecule is at least 40:1 and preferably lies between 45:1 and 80:1. In case the molecule contains also free hydrophilic groups other than carboxylic acid or anhydride groups, the ratio between the total number of carbon atoms and the sum of the number of free carboxylic acid groups and the number of anhydride groups is at least 55:1 and preferably lies between 60:1 and 100:1.

(6) The molecular weight does not exceed 2000 and preferably lies between 600 and 1600. The substances may be described by the general Formula 1:

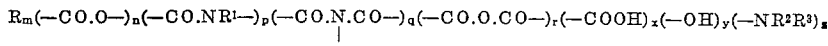

wherein:

$R_m$ represents $m$ radicals not all identical, each selected from the class consisting of mono- and poly-valent saturated and olefinically unsaturated radicals which are aliphatic hydrocarbon radicals containing up to 30 carbon atoms, cycloaliphatic hydrocarbon radicals containing 5 to 30 atoms, and heterocyclic radicals containing only carbon and oxygen in the ring and containing in all 4 to 30 carbon atoms, (poly- throughout this specification being regarded as including di-), $R^1$, $R^2$ and $R^3$ are hydrogen atoms or different or identical monovalent radicals of the kind specified in defining $R_m$ $(-CO.NR^1-)_p$ represents $p$ groups of the formula $-CO.NR^1-$ in which the $R^1$ groups may be different or identical, $(-NR^2R^3)_z$ represents $z$ different or identical groups of the formula $-NR^2R^3$ in which at least two of the radicals $R$, $R^1$, $R^2$ and $R^3$ contain 6 to 30, preferably 12 to 22, carbon atoms, $m=2$ to 12  
$n=0$ to 12 } $m-n$ preferably being 0 to 2  
$p=0$ to 3 } at least one of $n$, $p$ or $q$ is at least one  
$q=0$ to 3  
$r=0$ to 2  
$x=0$ to 1 when $r=1$ to 2 and $x=1$ to 3 when $r=0$  
$y=0$ to 3 } the sum of $y+z$ not exceeding $x+r$  
$z=0$ to 3 the ratio of the total number of carbon atoms to $x+r$ is at least 40:1 and preferably lies between 45:1 and 80:1, whenever $y$ and $z$ are zero and is at least 55:1 and preferably lies between 60:1 and 100:1, whenever $y$ and/or $z$ exceed zero, and the molecular weight does not exceed 2000 and preferably lies between 600 and 1600.

Of particular value are substances which satisfy both the general formula given above and the formula:

(2) 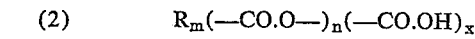

wherein $R_m$, $m$ and $n$ have the respective meanings defined above and $x=1$ to 3, $n$ being 1 to 12 since $p$ and $q$ are absent.

One method of obtaining substances satisfying conditions (1) to (6) above is by reacting oils containing fatty acid radicals (that is, aliphatic monocarboxylic acid radicals) which contain a pair of conjugated olefinic double bonds, with dienophile substances which are unsaturated dicarboxylic acids such as mono- and di-methyl maleic acids, and especially maleic acid, or derivatives of such acids such as anhydrides and esters, preferably half-esters, thereof. Instead of the unsaturated dicarboxylic acids, their anhydrides and esters, other derivatives of such acids such as the amides or ureides, may also be used with good effect as dienophile substances to be reacted with oils containing fatty acid radicals which contain a pair of conjugated olefinic double bonds. Instead of unsaturated dicarboxylic acids unsaturated carboxylic acids containing more than two carboxy groups may also be used. The dienophile substances may also be reacted with fatty acids containing a pair of conjugated olefinic double bonds or their esters with alcohols other than glycerol and the resulting tricarboxylic acid or anhydride or mono-ester may then be partly esterified with a monovalent alcohol or a partial ester of a polyvalent alcohol and a monocarboxylic acid, such as, for example, a mono- or diglyceride. Such substances may, for example, have the following formulae:

(3) 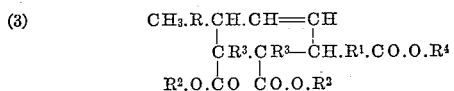

(4) 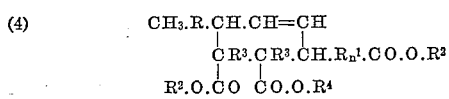

wherein:

R and $R^1$ are divalent saturated or olefinically unsaturated aliphatic hydrocarbon radicals containing together from up to 24, and preferably 6 to 16, carbon atoms, or cycloaliphatic hydrocarbon radicals, each containing at least 5 carbon atoms and together from 5 to 24, preferably 10 to 16, carbon atoms, $R^2$ is hydrogen or a monovalent saturated or olefinically unsaturated aliphatic hydrocarbon group containing up to 30, and preferably from 12 to 22, carbon atoms, or a cycloaliphatic hydrocarbon group containing from 5 to 30, preferably from 12 to 22, carbon atoms, at least one $R^2$ being hydrogen, $R^3$ is a hydrogen atom or a methyl or ethyl group and $R^4$ is a radical of the formula $-CH_2.(CH.R^5)_n.CH_2R^5$ in which $n=0$ to 6, and $R^5$ is hydrogen or a monovalent saturated or olefinically unsaturated aliphatic carboxylic acid radical containing 2 to 30, preferably 12 to 22, carbon atoms, the $n+1$ of such radicals $R^5$ being different or identical.

According to another method, substances satisfying the above conditions are obtained by reacting esters containing aliphatic or cycloaliphatic monocarboxylic acid radicals which contain a pair of conjugated olefinic double bonds, with dienophile substances which are unsaturated monocarboxylic acids such as for example sorbic acid, acrylic acid, crotonic acid, propiolic acid, hexenoic acid, and undecylenic acid.

Preferably the esters treated in these methods are oils consisting of triesters of glycerol in which only one of the three fatty acid radicals contains conjugated olefinic double bonds, none of these bonds being terminal. Suitable oils containing doubly unsaturated fatty acid radicals with conjugated double bonds can easily be obtained by isomerizing oils containing doubly unsaturated fatty acid radicals with non-conjugated double bonds, for example, by heating them to a temperature of about 140° C. for a few hours in the presence of a nickel catalyst containing sulphur. The oils to be used as starting material preferably contain a high proportion of linoleic acid radicals, as, for example, soya bean oil and sunflower oil. Preferably, in the isomerized oil the proportion of fatty acid radicals containing conjugated olefinic bonds should amount to at least 20% of the total weight of fatty acid radical present. The isomerisation may also be effected during the reaction with the dienophile substance.

The dienophile substance is preferably maleic acid anhydride or a partial ester of maleic acid with an aliphatic alcohol such, for example, as 1-octadecanol or sorbic acid. The reaction may be carried out by heating the reactants together for a few hours, for example one to three hours, at 60° to 180° C. and preferably 120° to 150° C., preferably in an inert atmosphere (for instance of carbon dioxide or nitrogen), if desired in the presence of a solvent, for example benzene, xylene, toluene, or acetone.

The products obtained by the reaction are thought to be Diels-Alder adducts of the unsaturated oil, having such formulae (according to the nature of the oil and of the dienophile substance) as, for example, (5)    $R.CO.O.CH_2.CH(O.CO.R^1).CH_2.O.CO.R^2$ and (6)    $R.CO.O.CH_2.CH(O.CO.R^2).CH_2.O.CO.R^1$ wherein: R and $R^1$ are monovalent saturated or olefinically unsaturated hydrocarbon radicals containing 5 to 29, and preferably 11 to 21, carbon atoms, and $R^2$ is a monovalent hydrocarbon radical containing a cyclic group formed by addition of the dienophile substance to the conjugated olefinic double bonds. $R^2$ may, for instance, have the formula:

(7) 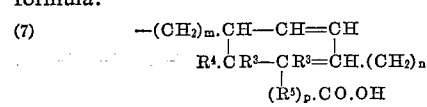

or the formula:

(8) 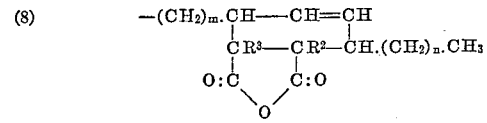

or the formula:

(9) 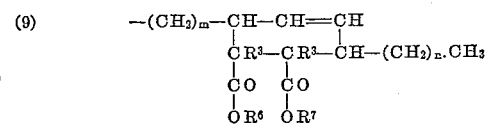

wherein:

m and n are whole numbers and
$m+n=0$ to 24, preferably 6 to 16,
$p=0$ or 1
$R^3$ is a hydrogen atom or a methyl or ethyl group,
$R^4$ is a hydrogen atom or a monovalent saturated or olefinically unsaturated aliphatic hydrocarbon radical containing up to 3 carbon atoms, and
$R^5$ is a methylene group or a divalent saturated or olefinically unsaturated aliphatic hydrocarbon radical containing 2 carbon atoms,
$R^6$ and $R^7$ are hydrogen atoms or monovalent saturated or olefinically unsaturated aliphatic hydrocarbon radicals containing up to 22, and preferably 12 to 18, carbon atoms, one of them being such a radical and the other a hydrogen atom.

A further general formula for additives of the kind referred to is Formula 10 below.

(10) 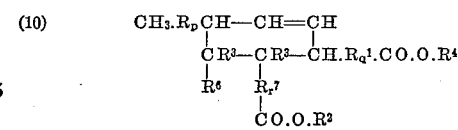

wherein:

R and $R^1$ are different or identical divalent radicals containing up to 24, and preferably 6 to 16, carbon atoms and selected from the class consisting of hydrocarbon radicals and cycloaliphatic hydrocarbon radicals containing at least 5 carbon atoms, $R^2$ is selected from the class consisting of hydrogen atoms, monovalent aliphatic hydrocarbon radicals containing from 1 to 30, and preferably 12 to 22, carbon atoms, and cycloaliphatic hydrocarbon radicals containing from 5 to 30 carbon atoms, $R^3$ is selected from the class consisting of hydrogen atoms and methyl and ethyl radicals, $R^4$ is selected from the class consisting of hydrogen atoms and radicals of the general formula $$-CH_2.(CH.R^5)_n.CH_2.R^5$$

in which $n=0$ to 16 and $R^5$ is selected from the class consisting of hydrogen and monovalent aliphatic carboxylic acid radicals containing 2 to 30 carbon atoms, the $R^5$ radicals not necessarily being identical and $R^2$ and $R^4$ being interchangeable, $R^6$ is selected from the class consisting of hydrogen atoms, monovalent aliphatic hydrocarbon radicals containing 1 to 3 carbon atoms and radicals of the formula $R^2.O.CO—$, $R^7$ is a divalent aliphatic hydrogen radical containing 1 or 2 carbon atoms, $p$ and $q$ are each equal to 0 or one and $r$ is 0 when $R^6$ has the formula $R^2.O.CO—$ and otherwise is one, at least one of the radicals $R^2$ and $R^4$ being hydrogen.

It has been found that substances formed by reaction of the unsaturated oils with the dienophile acid half-esters, for instance (referring to the formulae given above) substances of the Formula 5 or 6 wherein $R^2$ is a group of the Formula 9 in which either $R^6$ or $R^7$ is a hydrogen atom, on addition to foodstuffs of the kind referred to, especially margarine, keep their anti-spattering effect for a longer time than do substances formed by using as the dienophile the anhydride instead of a half ester, for instance substances of Formula 5 or 6 where $R^2$ has the Formula 8. The invention, therefore, also includes converting the anhydride adducts into the corresponding half-esters. This may be done by reacting them with a suitable alcohol.

For instance, the products obtained from the unsaturated oil and maleic acid anhydride may be heated with the alcohol for a few hours, for instance, one to five hours at 50° to 120° C., preferably 70° to 80° C., if desired in the presence of an esterification catalyst. The alcohol is preferably a monohydric aliphatic alcohol containing from 2 to 24 carbon atoms, especially a long chain alcohol of this kind containing 12 to 20 carbon atoms such as 1-hexadecanol or 1-octadecanol. Similarly the unsaturated oil may be reacted with the dienophile acid, for example maleic acid, and the resulting product partly esterified with an alcohol, if desired in the presence of an esterification catalyst, or the oil may be reacted with a di-ester of the acid and the resulting product partly saponified. It is preferred to use 1 to 1.1 equivalents of alcohol per equivalent of dienophile acid radical present in the adduct treated.

In effecting the reaction between the oil and the dienophile substance it is preferred to use 1 to 1.5 equivalents of the dienophile substance per equivalent of conjugated doubly unsaturated fatty acid radical present. Any unreacted dienophile substance may be removed after completion of the reaction, for example by distillation.

The reactions described above may be regarded as the synthesis of di-, or tri-carboxylic acids or their esters.

It is also possible to start from aliphatic or cycloaliphatic polycarboxylic acids in general and esterify them partly with aliphatic or cycloaliphatic mono- or polyvalent alcohols or partial esters of aliphatic or cycloaliphatic polyvalent alcohols and aliphatic or cycloaliphatic mono- or polycarboxylic acids. Any remaining free hydroxy groups may be further esterified with aliphatic or cycloaliphatic mono- or polycarboxylic acids and any excess of free carboxylic acid groups may also be further esterified with aliphatic or cycloaliphatic mono- or polyvalent alcohols or partial esters of aliphatic or cycloaliphatic polyvalent alcohols and aliphatic or cycloaliphatic mono- or polycarboxylic acids, provided the substances obtained fulfill the conditions (1) to (6) enumerated above.

The aliphatic or cycloaliphatic carboxylic acid radicals present in such substances may be derived from monocarboxylic acids containing 2 to 30 carbon atoms such as, for example, acetic acid, propionic acid, butyric acid, valeric acid, caproic acid, heptanoic acid, caprylic acid, pelargonic acid, caprinic acid, lauric acid, myristic acid, palmitic acid, stearic acid, arachidic acid, eicosanoic acid, behenic acid, lignoceric acid, cerotic acid, melissic acid, palmitoleic acid, oleic acid, linoleic acid, linolenic acid, erucic acid, and other acids such as, for example, diglycollic acid.

They may also be derived from dicarboxylic acids containing 2 to 30 carbon atoms such as, for example, oxalic acid, malonic acid, succinic acid, glutaric acid, adipic acid, pimelic acid, suberic acid, azelaic acid, sebacic acid, maleic acid, citraconic acid, mesaconic acid, itaconic acid, fumaric acid, and dimeric fatty acids and from tricarboxylic acids, such as, for example, aconitic acid and trimeric fatty acids.

Furthermore, carboxylic acid groups may be introduced at suitable places in some of the substances described above by oxidation at double bonds or primary hydroxy groups. For example, the double bond present in the reaction product of an aliphatic or cycloaliphatic carboxylic acid containing two conjugated double bonds or its ester and a dienophile aliphatic or cycloaliphatic carboxylic acid may be oxidized to two carboxylic acid groups as exemplified by the following reaction scheme:

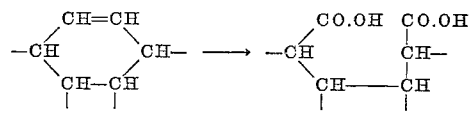

The aliphatic or cycloaliphatic alcohol radicals present in the substances described above may be derived from monovalent alcohols containing 2 to 30 carbon atoms such as, for example, ethanol, propanol, isopropanol, butanol, pentanol, hexanol, heptanol, octanol, nonanol, decanol, undecanol, dodecanol, tetradecanol, hexadecanol, octadecanol, eicosanol, docosanol, hexacosanol, octadecenol, cyclohexanol, cyclohexenol, methylcyclohexanol, methylcyclohexenol.

They may also be derived from divalent alcohols containing 2 to 30 carbon atoms such as ethylene glycol, propylene glycol, butylene glycol, pentane diols, hexane diols, heptane diols, octane diols, nonane diols, decane diols, dodecane diols, tetradecane diols, hexadecane diols, octadecane diols, eicosane diols, from trivalent alcohols such as, for example, glycerol, from tetravalent alcohols such as, for example, pentaerythritol, and from other polyvalent alcohols such as, for example, the alcohols derived from mono- or di-saccharides or inositol.

Finally, they may be derived from condensation products of polyvalent alcohols such as, for example, diglycol, triglycol, tetraglycol, pentaglycol, hexaglycol, diglycerol, triglycerol, tetraglycerol, pentaglycerol, hexaglycerol, dipentaerythritol or they may contain additional aldehyde or keto groups, such as, for example, the mono- or disaccharides. For example, a diglyceride obtained from a fatty oil may be esterified with a dicarboxylic acid, or the hydroxy groups of a disaccharide may be partly esterified with a dicarboxylic acid and partly with monocarboxylic acids, or glycerol may be esterified partly with a partial ester of a dicarboxylic acid and a monovalent alcohol and partly with a free dicarboxylic acid or its anhydride. According to another method, substances satisfying the conditions enumerated above are obtained by reacting esters such as glycerides, especially triglycerides, containing radicals of aliphatic or cycloaliphatic hydroxy monocarboxylic acids (hereinafter referred to as "hydroxy fatty acid radicals") with aliphatic or cycloaliphatic dicarboxylic acids, or by reacting the hydroxy acid with the dicarboxylic acid and esterifying the carboxyl groups with a suitable alcohol at a suitable stage in the process, for instance after the reaction with the dicarboxylic acid.

The hydroxy fatty acid radicals present in the esters are preferably radicals of saturated or unsaturated, monohydroxy fatty acids, containing from 12 to 26, preferably 16 to 18, carbon atoms. Ricinoleic acid is particularly suitable, but others such as mono- or di-hydroxystearic acid or epoxidised unsaturated fatty acids with 12 to 26 carbon atoms may also be used.

The esters treated may be triesters of glycerol in which one, two or all three of the acid radicals are hydroxy fatty acid radicals as defined above.

Thus according to a specific form of the invention acids of the formula $R^4(COOH)_2$, where $R^4$ is a saturated divalent aliphatic hydrocarbon radical containing 1 to 8 carbon atoms, or an unsaturated divalent aliphatic hydrocarbon radical containing 2 to 8 carbon atoms are reacted as such or in the form of suitable derivatives, for example the corresponding anhydrides, with triglyceride of such formulae as:

(11) $R.CO.O.CH_2.CH(O.CO.R^1).$
$CH_2.O.CO.R^2.CH(OH).R^3$

(12) $R.CO.O.CH_2.CH(O.CO.R^2.CH(OH).R^3).$
$CH_2.O.CO.R^2.CH(OH).R^3$

(13) $R^3.CH(OH).R^2.O.CO.CH_2.$
$CH(O.CO.R^2.CH(OH).R^3).CH_2.O.CO.R^2.CH(OH).R^3$ where R and $R^1$ are saturated or olefinically unsaturated monovalent aliphatic hydrocarbon radicals containing 5 to 25, preferably 11 to 17, carbon atoms, $R^2$ is a saturated or olefinically unsaturated divalent aliphatic hydrocarbon radical containing 2 to 25 carbon atoms, and $R^3$ is a saturated or olefinically unsaturated monovalent aliphatic hydrocarbon radical containing up to 25 carbon atoms, $R^2$ and $R^3$ preferably together containing 4 to 24, and especially 10 to 16, carbon atoms.

Instead of the esters a mixture of a hydroxy fatty acid and an alcohol, such as, for example, a mono-, di- or polyvalent alcohol, may also be used.

Alternatively the esters of the invention may contain one or more radicals derived from the hydroxy acid according to the functionality of the alcohol used in esterification, for instance two molecules of the hydroxy acid may be linked by esterification with the dicarboxylic acid and the resulting product may be esterified with a monohydric alcohol to give acyclic esters containing two radicals derived from the hydroxy acid; or with a dihydric alcohol to give esters containing two such radicals and/or esters containing more than two; or with a trihydric alcohol to form cyclic esters containing three such radicals and/or acyclic esters containing more than three. Similarly with alcohols of higher functionality, for instance pentaerythritol, acyclic and/or cyclic esters containing a number of such radicals can be obtained. Thus, for example, by esterifying the hydroxy groups in two molecules of a hydroxy acid of the formula:

$R^3.CH.(OH)R^2.CO.OH$ with a dicarboxylic acid of the formula:

$R^4(COOH)_2$ an intermediate ester of the formula:

(14) $R^3.CH.(R^2.CO.OH)O.CO.R^4.$
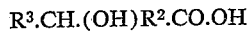

can be obtained which can be converted into an ester according to the invention having the formula:

(15) $R^3CH(R^2.CO.OH).O.CO.R^4.CO.O.$

by further esterification with an alcohol of the formula ROH where:

R and $R^3$ are saturated or olefinically unsaturated monovalent aliphatic hydrocarbon radicals containing 2 to 25, preferably 5 to 17, carbon atoms;

$R^2$ is a saturated or olefinically unsaturated divalent aliphatic hydrocarbon radical containing 5 to 25 carbon atoms; and $R^4$ is a saturated divalent aliphatic hydrocarbon radical containing 1 to 8 carbon atoms or an olefinically unsaturated divalent aliphatic hydrocarbon radical containing 2 to 8 carbon atoms.

Similarly by using an alcohol of the formula $HO.R^5.OH$, where $R^5$ is a divalent aliphatic hydrocarbon radical containing at least two carbon atoms, one may obtain products similar to (15) but, in which in place of radical R, there is a radical $.R^5.$ joining two $R^2.CO.O$ groups derived from different molecules of (14).

When an oil with a high proportion of glycerides containing two or three hydroxy fatty acid radicals such, for example, as castor oil, is used, care should be taken that at least part of the aliphatic dicarboxylic acid is doubly esterified, that is, that both carboxylic acid groups of the dicarboxylic acid are bound to hydroxy groups of the hydroxy fatty acid radicals. For example, if a dicarboxylic acid such as maleic acid is reacted with 1 mole of castor oil, about 0.4 mole dicarboxylic acid may be bound at both carboxylic acid groups and about 1 mole at only one carboxylic acid group.

In many cases it is preferred to use an oil with a substantial proportion of glycerides containing only one hydroxy fatty acid radical.

Suitable oils of this type can easily be obtained by interesterifying castor oil with an oil containing no hydroxy fatty acid radicals such, for example, as palm oil, soy bean oil, cottonseed oil or groundnut oil, for example by heating a mixture of the oils to a temperature of about 60° to 130° C. for 1 to 2 hours in the presence of an interesterification catalyst such as sodium methylate. The proportion of castor oil to nonhydroxy fatty acid oil is preferably about 1:4. The interesterified oil should preferably contain at least 25 mol percent of glycerides containing only one hydroxy fatty acid radical, not more than 10 mol percent of glycerides containing two hydroxy fatty acid radicals and not more than 1 to 2 mol percent of glycerides containing three hydroxy fatty acid radicals; the proportion of glycerides containing one to those containing three hydroxy fatty acid radicals should preferably be greater than 40:1. When an oil of this type is used the aliphatic dicarboxylic acid is preferably practically wholly reacted with only one of its carboxylic acid groups.

The hydroxy groups of the hydroxy carboxylic acid radicals should be esterfied with the dicarboxylic acid to an extent of at least 50%, and preferably of 75 to 100%.

The aliphatic dicarboxylic acids may be saturated or olefinically unsaturated and contain from 3 to 10 carbon atoms. Maleic acid and succinic acid have been found particularly useful, but others such as malonic acid, glutaric acid, adipic acid, pimelic acid, suberic acid, azelaic acid, sebacic acid, fumaric acid, citraconic acid, mesaconic acid, itaconic acid, malic acid or diglycollic acid may also be used. Instead of the free acids their anhydrides or substances producing them under the circumstances of the reaction such as, for example, citric acid, may be used. The reaction may be carried out by heating the reactants together for a few hours, for example two to five hours, at 60° to 180° C., and preferably 100° to 160° C., preferably in an inert atmosphere (for instance of carbon dioxide or nitrogen), if desired in the presence of an esterification catalyst and/or a solvent, such as, for example, benzene, toluene or acetone.

The products obtained by the reaction are thought to be esters of the dicarboxylic acid with the hydroxy group of one or two of the hydroxy fatty acid radicals contained in the oil, having such formulae (according to the nature of the oil and of the dicarboxylic acid) as, for example:

(16)
R.CO.O.CH$_2$.CH(O.CO.R$^1$).CH$_2$.O.CO.R$^2$.CH(X).R$^3$

(17)
R.CO.O.CH$_2$.CH(O.CO.R$^2$.CH(X).R$^3$).CH$_2$.O.CO.R$^1$

(18) R$^3$.CH(X).R$^2$.CO.O.CH$_2$.CH(O.CO.R$^2$.CH(X$^1$).R$^3$).CH$_2$.O.CO.R$^2$.CHR$^3$

(19) R$^3$.CH(X$^1$).R$^2$.CO.O.CH$_2$.CH(O.CO.R$^2$.CH(X).R$^3$).CH$_2$.O.CO.R$^2$.CH.R$^3$
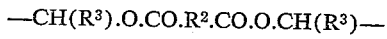

(20) R.CO.O.CH$_2$.CH.(O.CO.R$^1$).CH$_2$O.CO.R$^2$.CH(X$^1$).R$^3$

R$^3$.CH(X)R$^2$.CO.O.CH$_2$.CH.(O.CO.R$^1$).CH$_2$.O.CO.R$^2$.CH.R$^3$

(21) R.CO.O.CH$_2$.CH.(O.CO.R$^1$).CH$_2$.O.CO.R$^2$.CH(X$^1$).R$^3$

R$^3$.CH(X)R$^2$.CO.O.CH$_2$.CH.(O.CO.R$^2$.CH.R$^3$).CH$_2$.O.CO.R$^1$ wherein: R and R$^1$ are saturated or olefinically unsaturated monovalent aliphatic hydrocarbon radicals containing 5 to 25, preferably 11 to 17 carbon atoms, R$^2$ is a saturated or olefinically unsaturated divalent aliphatic hydrocarbon radical containing 2 to 25 carbon atoms and R$^3$ is a saturated or olefinically unsaturated monovalent aliphatic hydrocarbon radical containing up to 25 carbon atoms, R$^2$ and R$^3$ preferably containing together 4 to 24, and especially 10 to 16, carbon atoms, and X is a radical of the formula .O.CO.R$^4$.CO.OH, wherein R$^4$ is a saturated divalent hydrocarbon radical containing from 1 to 8 carbon atoms or an unsaturated divalent hydrocarbon radical containing from 2 to 8 carbon atoms, and X$^1$ is a radical of the formula .O.CO.R$^4$.CO.O where R$^4$ has the same meaning as above.

It will be appreciated that the dicarboxylic acid may form half-ester linkages of the formula

—CH(R$^3$).O.CO.R$^2$.COOH by reaction with a single OH group in the glyceride as well as ester linkages of the formula

—CH(R$^3$).O.CO.R$^2$.CO.O.CH(R$^3$)— by reaction with two OH groups, which may be both in a single molecule of the glyceride or in two different molecules.

It may be that interesterification occurs to some extent during the reaction and gives rise to products in which one of the carboxylic acid groups of the dicarboxylic acid is esterified with the glycerol and the other with the hydroxy group of the hydroxy fatty acid, such as, for example:

(22)
HO.CO.R$^2$.CH.(R$^3$).X$^1$.CH$_2$.CH(O.CO.R).CH$_2$.CO.O.R$^1$

(23)
R.CO.O.CH$_2$.CH(X$^1$.CH(R$^3$).R$^2$.CO.OH).CH$_2$.CO.O.R$^1$

(24)
HO.CO.R$^2$.CH(R$^3$).X$^1$.CH$_2$.CH
  (O.CO.R).CH$_2$.X$^1$.CH(R$^3$).R$^2$.CO.OH

(25)
HO.CO.R$^2$.CH(R$^3$).X$^1$.CH$_2$.CH
  (O.CO.R).CH$_2$.O.CO.R$^2$.CH(X).R$^3$
etc.

In effecting the reaction between the oil and the dicarboxylic acid it is preferred to use 1 to 3 equivalents of the dicarboxylic acid per equivalent hydroxy fatty acid radical present. Any unreacted dicarboxylic acid may be removed after completion of the reaction, for example by distillation or by washing with water.

Aliphatic or cycloaliphatic mono- or polyhydroxy-carboxylic acids may also be esterified with aliphatic or cycloaliphatic monocarboxylic acids. Aliphatic or cycloaliphatic mono- or polyhydroxycarboxylic acids may be esterified with themselves and/or with other aliphatic or cycloaliphatic mono- or polyhydroxycarboxylic acids and any remaining free hydroxy groups in such substances may be esterified with aliphatic or cycloaliphatic monocarboxylic acids or partial esters of polycarboxylic acid and aliphatic or cycloaliphatic alcohols or such groups may be lactonized with a neighbouring free carboxylic acid group. Such substances may, for example, have the following formulae:

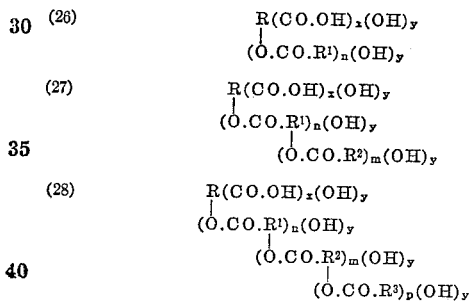

etc. wherein:

R, R$^1$, R$^2$ and R$^3$ are mono- or polyvalent saturated or olefinically unsaturated aliphatic hydrocarbon radicals containing up to 30, preferably 12 to 22, carbon atoms, or cycloaliphatic hydrocarbon radicals containing 5 to 30, preferably 12 to 22 carbon atoms, m, n and p are whole numbers from 1 to 6, preferably 1 to 4,
$x=1$ to 3, preferably 1, and
$y=0$ to 3, preferably 0.

For example, dihydroxy stearic acid may be esterified with two molecules of lauric acid, myristic acid, palmitic acid, stearic acid, oleic acid, linoleic acid or linolenic acid, or recinoleic acid may be interesterified to a polyestolide, or citric acid may be esterified with two molecules of palmityl alcohol, stearyl alcohol or oleyl alcohol and the free hydroxy group with acetic acid, propionic acid, butyric acid or any of the higher fatty acids.

Other hydroxy acids which may serve as components of the products according to the present invention are, for example, lactic acid, malic acid, tartaric acid, glyceric acid, tartronic acid, mucic acid, and sugar acids.

Moreover, any double bond present in any of the substances described may be epoxidized and the resulting hydroxy groups esterified with aliphatic or cycloaliphatic carboxylic acids.

According to another method aliphatic or cycloaliphatic compounds containing amino groups are reacted with aliphatic or cycloaliphatic compounds containing carboxyl groups to give substances satisfying the conditions enumerated. The aliphatic or cycloaliphatic compounds containing amino groups may be aliphatic or cycloaliphatic amines, amino alcohols, amino acids, amino acid esters such as, for example, palmitylamine, stearylamine, oleylamine, glutamic acid, beta-hydroxy glutamic acid, aspartic acid, asparagine, glutamine, glycocoll, sarcosine, alanine, serine, alpha-aminobutyric acid, valine, norvaline, leucine, isoleucine, and norleucine. The aliphatic or cycloaliphatic compounds containing carboxyl groups may be aliphatic or cycloaliphatic mono- or poly-carboxylic acids or their functional derivatives, such as the acid chlorides, anhydrides or partial esters.

Conversely, such substances may be prepared by reacting aliphatic or cycloaliphatic carboxylic acid amides with suitable aliphatic or cycloaliphatic compounds.

For example, stearoyl chloride may be reacted with glutamic acid monostearyl ester or palmitylamine may be reacted with stearoyl chloride and succinic anhydride.

The substances described above may be prepared by any suitable method, for example by dienophile addition, oxidation, esterification or condensation.

In effecting the reactions care should be taken to avoid undesired secondary reactions such as polymerisations. In consequence reaction temperatures should be kept as low as possible; they should not exceed 200° C. and preferably be between 50° and 140° C.

The products referred to above not only improve the frying properties of emulsions of water and fat such as margarine, but they also improve the stability of such emulsions; for example, emulsions containing the said products may be heated to 80° C. for a long time without separating.

The said products may be incorporated in foodstuffs of the kind referred to, either singly or in combination, to improve their frying properties and stability, in amounts of 0.01 to 5% of the weight of fat in the emulsion forming the basis of the foodstuff. Good results are obtained in many cases with amounts of 0.1 to 0.2% but smaller or larger amounts may be used according to circumstances. Other substances commonly present in margarine and like products as marketed, such as milk, skimmed milk, proteins, egg-yolk, mono- and diglycerides, salt and flavouring substances may also be incorporated. The incorporation of proteins, such as casein, is advantageous in certain cases. In some cases the addition of lecithin is undesirable. The said products are especially important for use in salt-free and air-free margarine. They may also be used in partially inverted oil-in-water emulsions such as those described in British specification No. 801,118 as well as in normal water in oil emulsions.

The formulae set out below by way of example are thought to represent the structures of various classes of substances that, in accordance with the invention, provide suitable additives. The examples that follow the last of these formulae (and which are referred to in connection with them) illustrate the preparation and use of substances of these various classes.

Class 1 (see for instance, Examples 1 and 2).

(29)
```
        CH=CH
       /     \
   R—CH       CH—R¹.CO.O.CH₂.CH.O.CO.R³
       \     /                |
        CH—CH                 CH₂.O.CO.R⁴
        |   |
        R²  CO.OH
``` or

(30)
```
        CH=CH
       /     \
   R.CH       CHR¹.CO.OH
       \     /
        CH—CH
        |   |
        R²  CO.O.CH₂.CH(O.CO.R³).CH₂.O.CO.R⁴
``` wherein:

R is a monovalent aliphatic hydrocarbon radical containing from 1 to 29 carbon atoms, or a cycloaliphatic hydrocarbon radical containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$ is hydrogen or a monovalent aliphatic hydrocarbon radical containing from 1 to 3 carbon atoms, $R^3$ and $R^4$ are monovalent aliphatic or cycloaliphatic hydrocarbon radicals containing from 5 to 29 carbon atoms.

Class 2 (see for instance Example 4).

(31)
```
        CH=CH
       /     \
   R.CH       CH.R¹.CO.O.CH₂.CH.O.CO.R³
       \     /                |
        CH—CH                 CH₂.O.CO.R⁴
        |   |
        R²NH.CO CO.OH
``` or

(32)
```
        CH=CH
       /     \
   R.CH       CH.R¹.CO.OH
       \     /
        CH—CH
        |   |
        R²NH.CO CO.O.CH₂.CH(O.CO.R³).CH₂.O.CO.R⁴
``` wherein:

R is a monovalent aliphatic hydrocarbon radical containing from 1 to 29 carbon atoms or a cycloaliphatic hydrocarbon radical containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$, $R^3$ and $R^4$ are monovalent aliphatic or cycloaliphatic hydrocarbon radicals containing from 5 to 29 carbon atoms.

Class 3 (see, for instance, Examples 5, 7 and 8).

(33)
```
        CH=CH
       /     \
   R.CH       CH.R¹.CO.O.R²
       \     /
        CH—CH
        |   |
        CO.OH CO.O.R³
``` or

(34)
```
        CH=CH
       /     \
   R.CH       CH.R¹.CO.OH
       \     /
        CH—CH
        |   |
        R².O.CO CO.O.R³
``` wherein:

R is a monovalent aliphatic hydrocarbon radical containing from 1 to 25 carbon atoms or a cycloaliphatic hydrocarbon radical containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$ and $R^3$ are monovalent aliphatic or cycloaliphatic hydrocarbon radicals containing from 5 to 29 carbon atoms.

Class 4 (see, for instance, Examples 9 and 10).

(35)
```
CH₂.O.CO.R.CO.OH
|
CH.O.CO.R¹
|
CH₂.O.CO.R²
``` or

(36)
```
CH₂.O.CO.R¹
|
CH.O.CO.R.CO.OH
|
CH₂.O.CO.R²
``` wherein:

R is a divalent aliphatic hydrocarbon radical containing from 1 to 28 carbon atoms or a cycloaliphatic hydrocarbon radical containing from 5 to 28 carbon atoms, $R^1$ and $R^2$ are monovalent aliphatic or cycloaliphatic hydrocarbon radicals containing from 5 to 29 carbon atoms.

Class 5 (see, for instance, Examples 11, 23 and 24).

(37) 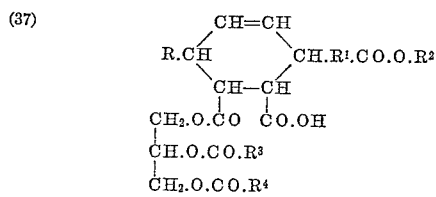

or

(38) 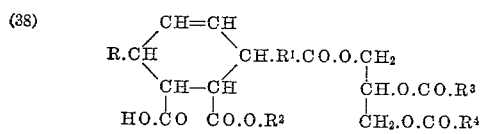

wherein:

R is a monovalent aliphatic hydrocarbon radical containing from 1 to 29 carbon atoms or a cycloaliphatic hydrocarbon radical containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$, $R^3$ and $R^4$ are monovalent aliphatic or cycloaliphatic hydrocarbon radicals containing from 5 to 29 carbon atoms.

Class 6 (see, for instance, Example 12).

(39) 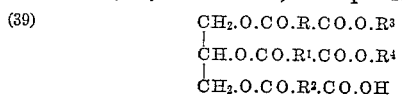

or

(40) 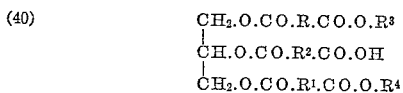

wherein:

R, $R^1$ and $R^2$ are divalent aliphatic hydrocarbon radicals containing from 1 to 28 carbon atoms or cycloaliphatic hydrocarbon radicals containing from 5 to 28 carbon atoms, $R^3$ and $R^4$ are monovalent aliphatic or cycloaliphatic hydrocarbon radicals containing from 5 to 29 carbon atoms.

Class 7 (see, for instance, Example 13).

(41) 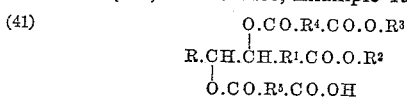

or

(42) 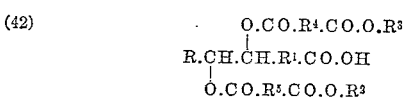

wherein:

R is a monovalent aliphatic hydrocarbon radical containing from 1 to 29 carbon atoms or a cycloaliphatic hydrocarbon radical containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$ and $R^3$ are monovalent aliphatic or cycloaliphatic hydrocarbon radicals containing from 5 to 29 carbon atoms, $R^4$ and $R^5$ are divalent aliphatic hydrocarbon radicals containing from 1 to 28 carbon atoms or cycloaliphatic hydrocarbon radicals containing from 5 to 28 carbon atoms.

Class 8 (see, for instance, Example 14).

(43) 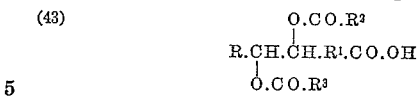

wherein:

R is a monovalent aliphatic hydrocarbon radical containing from 1 to 29 carbon atoms or a cycloaliphatic hydrocarbon containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$ and $R^3$ are monovalent aliphatic or cycloaliphatic hydrocarbon radicals containing from 5 to 29 carbon atoms.

Class 9 (see, for instance, Example 15).

(44) 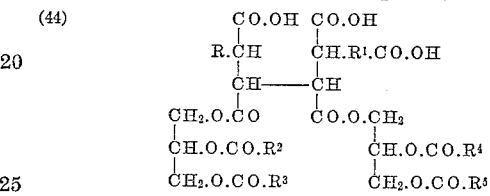

or

(45) 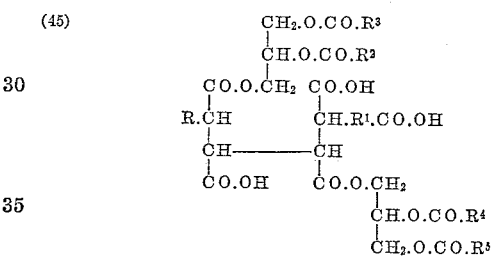

wherein:

R is a monovalent aliphatic hydrocarbon radical containing from 1 to 29 carbon atoms or a cycloaliphatic hydrocarbon radical containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$, $R^3$, $R^4$ and $R^5$ are monovalent aliphatic or cycloaliphatic hydrocarbon radicals containing from 5 to 29 carbon atoms.

Class 10 (see, for instance, Example 17).

(46) 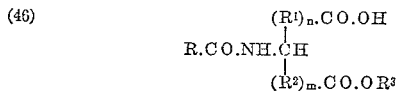

wherein:

R is a monovalent aliphatic or cycloaliphatic hydrocarbon radical containing from 5 to 29 carbon atoms, $R^1$ and $R^2$ are divalent aliphatic hydrocarbon radicals containing 1 or 2 carbon atoms, $R^3$ is a monovalent aliphatic or cycloaliphatic hydrocarbon radical containing from 5 to 29 carbon atoms; and $m$ and $n$ is each equal to 0 or 1.

Class 11.

(47) 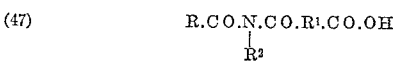

wherein:

R is a monovalent aliphatic or cycloaliphatic hydrocarbon radical containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$ is a monovalent aliphatic or cycloaliphatic hydrocarbon radical containing from 5 to 29 carbon atoms.

Class 12 (see, for instance, Example 16).

(48) 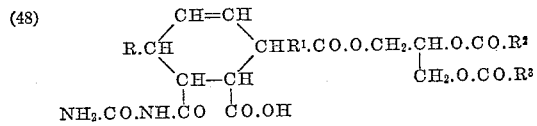

wherein:

R is a monovalent aliphatic hydrocarbon radical containing from 1 to 29 carbon atoms or a cycloaliphatic hydrocarbon radical containing from 5 to 29 carbon atoms, $R^1$ is a divalent aliphatic hydrocarbon radical containing from 1 to 28 carbon atoms or a cycloaliphatic hydrocarbon radical containing from 5 to 28 carbon atoms, $R^2$ and $R^3$ are monovalent aliphatic or cycloaliphatic hydrocarbon radicals containing from 5 to 29 carbon atoms.

Class 13 (see, for instance, Example 18).

(49) 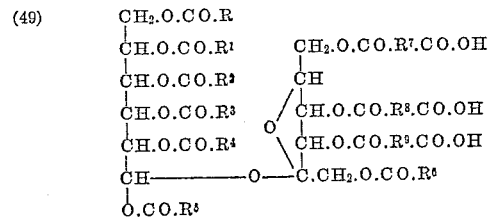

wherein:

R, $R^1$, $R^2$, $R^3$, $R^4$, $R^5$ and $R^6$ are monovalent aliphatic or cycloaliphatic hydrocarbon radicals containing from 5 to 29 carbon atoms, $R^7$, $R^8$ and $R^9$ are divalent aliphatic hydrocarbon radicals containing from 1 to 28 carbon atoms or cycloaliphatic hydrocarbon radicals containing from 5 to 28 carbon atoms.

Class 14 (see for instance, Example 19b).

(50) $RO.CO.CH_2.C.(O.CO.R^1)(CO.OR^2).CH_2.CO.OH$ wherein: R, $R^1$ and $R^2$ are monovalent aliphatic or cycloaliphatic hydrocarbon radicals containing from 5 to 29 carbon atoms.

Class 15 (see, for instance, Example 20).

(50a) 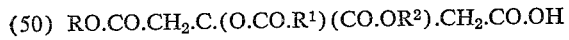

wherein:

R, $R^1$ and $R^2$ are monovalent aliphatic or cycloaliphatic hydrocarbon radicals containing from 5 to 29 carbon atoms, $R^3$ is a divalent aliphatic hydrocarbon radical containing from 1 to 28 carbon atoms or a cycloaliphatic hydrocarbon radical containing from 5 to 28 carbon atoms.

Class 16 (see, for instance, Examples 21 and 22).

(51) 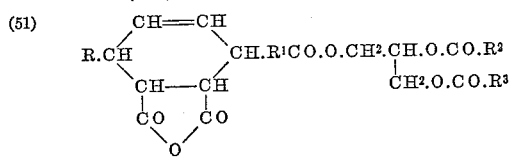

wherein:

R is a monovalent aliphatic hydrocarbon radical containing from 1 to 29 carbon atoms, or a cycloaliphatic hydrocarbon radical containing from 5 to 29 carbon atoms, $R^1$ is a divalent aliphatic hydrocarbon radical containing from 1 to 28 carbon atoms, or a cycloaliphatic hydrocarbon radical containing from 5 to 28 carbon atoms, $R^2$ and $R^3$ are aliphatic or cycloaliphatic hydrocarbon radicals containing from 5 to 29 carbon atoms.

Class 17 (see, for instance, Examples 25, 26 and 27).

(52) 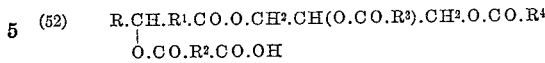

or

(53) 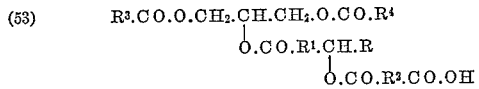

wherein:

R is a monovalent aliphatic hydrocarbon radical containing from 1 to 29 carbon atoms or a cycloaliphatic hydrocarbon radical containing from 5 to 29 carbon atoms, $R^1$ and $R^2$ are divalent aliphatic hydrocarbon radicals containing from 1 to 28 carbon atoms or cycloaliphatic hydrocarbon radicals containing from 5 to 28 carbon atoms, $R^3$ and $R^4$ are monovalent aliphatic or cycloaliphatic hydrocarbon radicals containing from 5 to 29 carbon atoms or a group $R^1.CH.(O.CO.R^2.COOH)R.$.

Class 18 (see, for instance, Example 28).

(54) 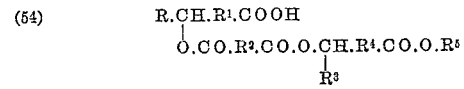

wherein:

R and $R^3$ are monovalent aliphatic hydrocarbon radicals containing from 1 to 29 carbon atoms or cycloaliphatic hydrocarbon radicals containing from 5 to 29 carbon atoms, $R^1$, $R^2$ and $R^4$ are divalent aliphatic hydrocarbon radicals containing from 1 to 28 carbon atoms or cycloaliphatic hydrocarbon radicals containing from 5 to 28 carbon atoms, $R^5$ is a monovalent aliphatic or cycloaliphatic hydrocarbon radical containing from 5 to 29 carbon atoms.

Class 19 (see, for instance, Example 29).

(55) 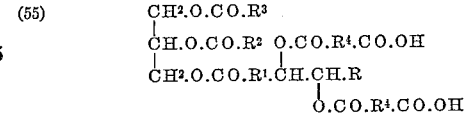

or

(56) 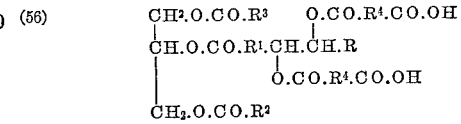

wherein:

R is a monovalent aliphatic hydrocarbon radical containing from 1 to 29 carbon atoms or a cycloaliphatic hydrocarbon radical containing from 5 to 29 carbon atoms, $R^1$ and $R^4$ are divalent aliphatic hydrocarbon radicals containing from 1 to 28 carbon atoms or cycloaliphatic hydrocarbon radicals containing from 5 to 28 carbon atoms, $R^2$ and $R^3$ are monovalent aliphatic or cycloaliphatic radicals containing from 5 to 29 carbon atoms.

The following examples illustrate the invention:

*Example 1*

An isomerized soya bean oil (1000 g.) containing 40% of conjugated doubly unsaturated fatty acid radicals, calculated on the total weight of fatty acid radicals present, was reacted with sorbic acid (150 g.) at a temperature of 130°–135° C. with stirring in a current of carbon dioxide for 2.5 to 3 hours. The unreacted sorbic acid was then removed by washing with water and the product dried. The resulting product (1100 g.) was miscible with oils and fats in all proportions.

300 g. of this product together with 800 g. monodiglyceride of tallow fatty acids were dissolved in 40 kg. of a margarine fat mixture consisting of 16% soya bean oil, 40% coconut oil, 34% cottonseed oil hardened to a melting point of 34° C., 5% palm oil and 5% palm oil hardened to a melting point of 42° C. and the solution was emulsified with an aqueous phase, consisting of 10 kg. water, 60 g. casein, 400 g. sodium chloride and 40 g. citric acid. The resulting margarine on frying did not spatter and produced a fine golden-yellow sediment not adhering to the frying pan, even after storage for 12 weeks.

*Example 2*

An isomerized soya bean oil (1000 g.) containing 30.5% of conjugated doubly unsaturated fatty acid radicals, calculated on the total weight of fatty acid radicals present, was elaidinized according to the method described by M. J. Danzig et al. (J. Amer. Oil Chem. Soc. 34, 1957, page 136), in order to convert the major part of the conjugated cis-trans double into trans-trans double bonds. The oil was then reacted with 65 g. acrylic acid in the presence of 5 g. hydroquinone (as an agent inhibiting polymerization) at a temperature of 185° to 190° C. with stirring in a current of carbon dioxide for 4 hours. The hydroquinone and the unreacted acrylic acid were then removed by washing with water and the product dried. The resulting product (1030 g.) was miscible with oils and fats in all proportions.

400 g. of this product together with 400 g. monodiglyceride of tallow fatty acids were dissolved in 40 kg. of the margarine fat mixture described in Example 1 and the solution was emulsified with an aqueous phase consisting of 2 kg. acidified skim milk and 8 kg. water. The resulting margarine had the same excellent properties as that described in Example 1.

*Example 3*

An isomerized cottonseed oil (750 g.) containing 25.3% of conjugated doubly unsaturated fatty acid radicals, which had been elaidinized as described in Example 2, was reacted with 40 g. propiolic acid in the presence of 2 l. toluene as a solvent at boiling point with refluxing of toluene for 4 hours. The toluene was then removed by distillation under normal pressure. The resulting product (770 g.) was miscible with oils and fats in all proportions.

40 g. of this product together with 20 g. monodiglyceride of tallow oil fatty acids were dissolved in 4 kg. of the margarine fat mixture described in Example 1 and the solution emulsified with an aqueous phase as described in Example 2. The resulting margarine had the same excellent properties as that described in Example 1.

*Example 4*

500 g. of a product obtained by reacting an isomerized soya bean oil containing 35% of conjugated doubly unsaturated fatty acid radicals with maleic acid anhydride for 3.5 hours at 150° under carbon dioxide were reacted with 100 g. stearylamine in the presence of 1.5 l. benzene as a solvent at boiling point with reflux of benzene for 2 hours.

The benzene was then removed by distillation under normal pressure. The resulting product (590 g.), consisting mainly of the monostearylamide of a maleic acid adduct of a linoleic acid radical—containing triglyceride, was miscible with oils and fats in all proportions.

20 g. of this product together with 40 g. monodiglyceride of tallow fatty acids were dissolved in 10 kg. of a margarine fat composition consisting of 18% cottonseed oil, 40% coconut oil, 32% cottonseed oil hardened to a melting point of 34° C., 5% palm oil and 5% palm oil hardened to a melting point of 42° C. and the solution was emulsified with an aqueous phase consisting of 0.5 kg. acidified skim milk and 2 kg. water. The resulting margarine on frying did not spatter and produced a fine golden-yellow sediment not adhering to the frying pan, even after storage for 18 weeks.

*Example 5*

Conjugated linoleic acid (280 g.=1 mole) was mixed with maleic acid anhydride (98 g.=1 mole) at a temperature of 60° C. and reacted at a temperature of 120°–125° C. with stirring in an atmosphere of carbon dioxide for 3 hours. The reaction product was then esterified with stearylalcohol (540 g.=2 moles) in the presence of 2 g. $SnCl_2 \cdot 2H_2O$ as an esterification catalyst at a temperature of 170° C. with stirring in an atmosphere of carbon dioxide for 3.5 to 4 hours. During the latter part of the reaction the mixture was kept under a vacuum of 20 mm. Hg until it showed an acid value of 65. The catalyst was then removed by filtration. The resulting product (840 g.) was miscible with oils and fats in all proportions.

200 g. of this product together with 160 g. monodiglycerides of tallow fatty acids were dissolved in 40 kg. of a margarine fat composition consisting of 20% groundnut oil, 40% coconut oil, 30% groundnut oil hardened to a melting point of 34° C., 5% palm oil and 5% palm oil hardened to a melting point of 42° C. and the solution was emulsified with 10 kg. of an aqueous phase consisting of 2 kg. acidified skim milk and 8 kg. water. The resulting margarine had the same excellent properties as that described in Example 1.

*Example 6*

A mixture of 56 g. sorbic acid and 49 g. maleic acid anhydride together with 1.5 l. benzene was heated at boiling point with reflux of benzene for 2 hours. The reaction product was then reacted with 270 g. stearylalcohol and 0.5 g. $SnCl_2 \cdot 2H_2O$ as an esterification catalyst at about the same temperature and water was distilled off in the form of its azeotropic mixture with benzene. The catalyst was removed by filtration and the benzene by distillation under normal pressure. The resulting product was a crystalline solid soluble in oils and fats.

30 g. of this product together with 16 g. monodiglyceride of tallow fatty acids were dissolved in 4 kg. of a margarine fat composition as described in Example 5 and the solution was emulsified with 1 kg. of an aqueous phase as described in Example 5. The resulting margarine had the same excellent properties as that described in Example 1.

*Example 7*

Fatty acids (1000 g.) derived from safflower oil were isomerized with the aid of an alkaline catalyst as described by M. J. Danzig et al. in J. Amer. Oil Chem. Soc. 34, 1957, page 136, to a content of 67.5% conjugated linoleic acid radicals, calculated on the total amount of fatty acid radicals present. The product was reacted with 284 g. maleic acid anhydride at a temperature of 125°–130° C. under stirring in a current of carbon dioxide for 3 hours. Unreacted fatty acids and maleic acid anhydride were removed by steam distillation under a vacuum of 5 mm. Hg at a temperature of 140° C. The reaction product was then esterified with 1300 g. stearylalcohol in the presence of 2 g. $SnCl_2 \cdot 2H_2O$ as an esterification catalyst and 3.5 l. xylene as a solvent at boiling point with reflux of xylene for 4.5 to 5 hours, water (37 g.) being distilled off in the form of its azeotropic mixture with xylene. The catalyst was removed by filtration and the xylene by distillation under a pressure of 15 mm. The resulting product (2150 g.) was miscible with oils and fats in all proportions.

1.6 kg. of this product together with 1.6 kg. monodiglyceride of tallow fatty acids were dissolved in 400 kg. of a margarine fat composition as described in Example 5 and the solution emulsified with an aqueous phase consisting of a suspension of 200 g. casein in 100 kg. of water. The resulting margarine had the same excellent properties as that described in Example 1.

*Example 8*

An isomerized soya bean oil (3000 g.) containing 40.8% of conjugated doubly unsaturated fatty acid radicals, was reacted with maleic acid anhydride (470 g.) at a temperature of 135°–137° C. with stirring in a current of carbon dioxide for 2.5 hours. Unreacted maleic anhydride was removed by steam distillation at the same temperature under a vacuum of 18 mm. Hg. The resulting product (3370 g.) was saponified with 10 l. of a 15% solution of potassium hydroxide in butanol-2 at boiling point with reflux of water for 2 hours, a major part of the butanol-2 removed by distillation and the remaining reaction mixture dissolved in 30 l. distilled water. After acidification with concentrated hydrochloric acid and slightly heating for a short period the aqueous phase was removed, the oily phase washed repeatedly with distilled water and dried under vacuum. The oily phase was then mixed with 50 l. petroleum ether and kept at a temperature of 15° C. for a few hours. The upper phase was decanted and the lower phase freed from residual petroleum ether. In this way 1290 g. of an adduct of maleic acid and conjugated linolenic and/or linoleic acid were obtained. 1000 g. of this product (2.53 moles) were esterified with 1480 g. stearylalcohol (5.5 moles) in the presence of 2 g. $SnCl_2.2H_2O$ as an esterification catalyst and 5 l. xylene as a solvent at boiling point with reflux of xylene for three hours. The xylene was removed by distillation under normal pressure and the catalyst by filtration. The resulting product (2300 g.) was miscible with oils and fats in all proportions. 120 g. of this product together with 160 g. monodiglyceride of tallow fatty acids were dissolved in 40 kg. of a margarine fat mixture as described in Example 5 and the solution emulsified with 10 kg. of an aqueous phase as described in Example 5. The resulting margarine had the same excellent properties as that described in Example 1.

*Example 9*

Refined rapeseed oil (1000 g.) was interesterified with glycerol (70 g.) in the presence of sodium hydroxide (3 g.) as an esterification catalyst at a temperature of 175° C. under stirring for 5 hours. After neutralisation with a solution of citric acid the catalyst was removed by washing repeatedly with water and the remaining product (about 1050 g.) dried under vacuum.

1000 g. of this product, containing 35% diglyceride and about 5% monoglyceride, were esterified with 135 g. sebacic acid in the presence of 2 g. $SnCl_2.2H_2O$ as an esterification catalyst and 2 l. xylene as a solvent at boiling point with reflux of xylene for 5 hours. The catalyst was removed by filtration and the xylene by distillation under normal pressure. The resulting product (1100 g.) was miscible with oils and fats in all proportions.

400 g. of this product were dissolved in 100 kg. of a margarine fat mixture as described in Example 5 containing 200 g. monodiglyceride of tallow fatty acids and the solution was emulsified with 25 kg. of an aqueous phase containing 50 g. casein. The resulting margarine had the same excellent properties as that described in Example 4.

*Example 10*

A mixture of oleic acid (200 g.), stearic acid (800 g.) and glycerol (105 g.) was esterified in the presence of 2 g. $SnCl_2.2H_2O$ at a temperature of 180° C. under a pressure of 15 mm. Hg for 6 hours. The remaining free fatty acids and the catalyst were removed by washing with dilute sodium hydroxide solution and water and the remaining product dried under vacuum; the product (980 g.) contained about 38% mono-oleodistearin, calculated statistically.

This product was dissolved in 10 l. acetone and heated to boiling point and 3000 g. pulverized potassium permanganate added gradually during a period of 2.5 hours according to the method described by Armstrong and Hilditch (J. Soc. Chem. Ind. 44, 1925, pages 43T–47T). After filtration and removal of the acetone by distillation under normal pressure the free fatty acids were distilled off in a current of steam under vacuum (15 mm. absolute). In this way 820 g. of a crystalline product, soluble in oils and fats, were obtained.

50 g. of this product together with 40 g. monodiglyceride of tallow fatty acids were dissolved in 10 kg. of a margarine fat mixture as described in Example 5 and the solution emulsified with 2.5 kg. of an aqueous phase consisting of 0.5 kg. acidified skim milk and 2 kg. water. The resulting margarine had the same excellent properties as that described in Example 4.

*Example 11*

A conjugated linoleic acid octadecylester (532 g.) was reacted with maleic acid anhydride (90 g.) in the presence of toluene (2.5 l.) as a solvent at boiling point with reflux of toluene for 3 hours. The reaction mixture was further reacted with a technical rapeseed oil diglyceride (1800 g.) containing 35% diglyceride and 5% monoglyceride at the same temperature for 2.5 hours. The toluene was removed by distillation under normal pressure. The resulting product (2400 g.) had a viscosity like honey and was miscible with oils and fats in all proportions.

250 g. of this product together with 200 g. monodiglyceride of tallow fatty acids were dissolved in 100 kg. of a margarine fat mixture as described in Example 5 and the solution emulsified with 25 kg. of an aqueous phase consisting of 5 kg. acidified skim milk and 20 kg. water. The resulting margarine on frying did not spatter and produced a fine sediment not adhering to the frying pan, even after storage for 16 weeks.

*Example 12*

Glycerol (92 g.=1 mole) was esterified with sebacic acid monostearylester (908 g.=2 moles) in the presence of 2 g. $SnCl_2.2H_2O$ as an esterification catalyst and 2 l. xylene as a solvent at boiling point with reflux of xylene for 4 hours. The reaction product was further esterified with succinic acid anhydride (100 g.=1 mole) under the same conditions for 2 hours. The xylene was removed by distillation under a pressure of 20 mm. absolute and the catalyst by filtration. The resulting product (1060 g.) was miscible with oils and fats in all proportions.

400 g. of this product together with 160 g. monodiglyceride of tallow fatty acids were dissolved in 40 kg. of a margarine fat mixtures as described in Example 4 and the solution emulsified with 10.4 kg. of an aqueous phase consisting of 4 kg. acidified skim milk, 6.0 kg. water, 200 g. sodium chloride and 200 g. citric acid. The resulting margarine on frying did not spatter and produced a fine sediment not adhering to the frying pan, even after storage for 12 weeks.

*Example 13*

Epoxystearic acid (298 g.=1 mole), prepared from oleic acid by treating it with peracetic acid at a temperature of 40° C. according to the method described by W. R. Schmitz (J. Am. Oil Chem. Soc. 31, 1954, page 363), was esterified with succinic acid (236 g.=2 moles) in the presence of benzene (2.5 l.) as a solvent at boiling point with reflux of benzene. After half an hour sulphuric acid (2.5 g.) was added as an esterification catalyst. Water liberated by the reaction was distilled off in the form of its azeotropic mixture with benzene. When no more water distilled over in this way stearylalcohol (540 g.=2 moles) was added to the reaction mixture and the heating prolonged for four hours by which time esterification was complete. The catalyst was then removed by washing with water and the solvent by distillation under normal pressure. The resulting product (1000 g.) was a white crystalline solid soluble in oils and fats.

300 g. of this product together with 160 g. monodiglyceride of tallow fatty acids were dissolved in 40 kg. of a margarine fat mixture as described in Example 5 and the solution emulsified with 10 kg. of an aqueous phase consisting of 4 kg. acidified skim milk and 6 kg. water. The resulting margarine had the same excellent properties as that described in Example 12.

*Example 14*

Dihydroxystearic acid (320 g.) was esterified with fatty acids derived from soya bean oil (600 g.) in the presence of 2 g. $SnCl_2.2H_2O$ as an esterification catalyst at a temperature of 175° C. and under a pressure of 15 mm. Hg under stirring for 5 hours. The catalyst was removed by filtration, free fatty acids removed by washing with 90% ethanol and the reaction product was dried under a pressure of 20 mm. absolute. The resulting product (820 g.) was miscible with oils and fats in all proportions.

320 g. of this product together with 320 g. monodiglyceride of tallow fatty acids were dissolved in 40 kg. of a margarine fat mixture as described in Example 5 and the solution was emulsified with 10 kg. of an aqueous phase as described in Example 13. The resulting margarine had the same excellent properties as that described in Example 12.

*Example 15*

An adduct (80 g.) of conjugated linoleic acid and maleic acid anhydride prepared as described in Example 5 was dissolved in acetone (3 l.) and heated to boiling point. Potassium permanganate (85 g.) dissolved in hot water (350 ml.) was added gradually in small portions during 2 hours. Manganese dioxide was removed by filtration and the precipitate was washed with acetone. The acetone was removed by evaporation and the residue dissolved in benzene (1.5 l.), mixed with a technical diglyceride (410 g.) of rapeseed oil containing 35% diglyceride and esterified in the presence of paratoluenesulphonic acid (2 g.) as an esterification catalyst at boiling point with reflux of benzene for 4 hours. Water formed during the reaction was removed in the form of its azeotropic mixture with benzene. The catalyst was removed by washing with water and the benzene by distillation first under normal pressure then and under a pressure of 15 mm. Hg in a current of carbon dioxide. The resulting product (480 g.) was miscible with oils and fats in all proportions.

100 g. of this product together with 40 g. monodiglyceride of tallow fatty acids were dissolved in 10 kg. of a margarine fat mixture consisting of 20% cottonseed oil, 40% coconut oil, 30% cottonseed oil hardened to a melting point of 34° C., 5% palm oil and 5% palm oil hardened to a melting point of 42° C. and the solution emulsified with 2.5 kg. of an aqueous phase consisting of 1 kg. acidified skim milk and 1.5 kg. water. The resulting margarine had the same excellent properties as that described in Example 12.

*Example 16*

500 g. of a product obtained by reacting an isomerised soya bean oil containing 35% of conjugated doubly unsaturated fatty acid radicals with maleic acid anhyride as described above in connection with Example 4 were reacted with 25 g. urea at a temperature of 120° to 130° C. under normal pressure for half an hour unreacted urea was extracted by washing with water and the residue dried. The resulting monoureide was easily soluble in fats and oils.

40 g. of this product together with 40 g. monodiglyceride of tallow fatty acids were dissolved in 10 kg. of the margarine fat mixture described in Example 4 and the solution was emulsified with 2.5 kg. of an aqueous phase as described in Example 4. The resulting margarine on frying did not spatter and produced a fine sediment not adhering to the frying pan, even after storage for 10 weeks.

*Example 17*

Stearoyl glutamic acid (50 g.) obtained according to the method described by E. Jungermann, J. F. Gerecht and I. J. Krems (J. Am. Chem. Soc. 1956, page 172), was esterified with stearyl-alcohol (50 g.) in the presence of paratoluene sulphonic acid (0.5 g.) as an esterification catalyst and benzene (1.5 l.) as a solvent at boiling point with reflux of benzene for 6 hours. The catalyst was removed by washing with water, the solution dried over sodium sulphate and the benzene removed by distillation under normal pressure. The resulting product (95 g.) was a white waxy solid, soluble in fatty oils. 80 g. of this product together with 40 g. monodiglyceride of tallow fatty acids were dissolved in 10 kg. of a margarine fat mixture as described in Example 1 and the solution was emulsified with 2.5 kg. of an aqueous phase consisting of 0.5 kg. acidified skim milk and 2 kg. water. The resulting margarine had the same excellent properties as that described in Example 16.

*Example 18*

Saccharose dipalmitate (163 g.=0.2 mole) and succinic acid anhydride (70 g.=0.7 mole) were heated together at a temperature of 100° C. in the presence of 50 g. potassium carbonate and 1.5 l. dimethylformamide as a solvent for 5.5 hours. The solvent was removed by distillation and at a temperature of 50° C. under a pressure of 20 mm. Hg and the residue dissolved in water, acidified with diluted sulphuric acid and extracted with ether. The ether solution was dried over sodium sulphate and the ether removed by distillation under normal pressure. The resulting product (210 g.), consisting of a mixture of succinic acid half esters of saccharose dipalmitate was reacted with stearoylchloride (320 g.) in the presence of 1.5 l. ethyl acetate as a solvent at boiling point with a reflux of the ethyl acetate for 4 hours. The ethylacetate was removed by distillation under normal pressure. The resulting product (450 g.) was a yellowish waxy solid, soluble in fatty oils. 100 g. of this product together with 40 g. monodiglyceride of tallow fatty acids were dissolved in 10 kg. of a margarine fat mixture as described in Example 5 and the solution was emulsified with 2.5 kg. of an aqueous phase as described in Example 17. The resulting margarine had the same excellent properties as that described in Example 16.

*Example 19*

Citric acid monohydrate (300 g.=1.4 mole) were added under stirring to molten stearyl alcohol (770 g.) and the mixture stirred for 3 hours at a temperature of 150° C. under a pressure of 50 mm. Hg. The resulting product (a) (1000 g.) was a yellowish waxy solid, soluble in fatty oils.

500 g. of product (a) were reacted with 285 g. stearoylchloride in the presence of 0.7 l. benzene as a solvent at boiling point with reflux of benzene for 4 hours. The benzene was removed by distillation under normal pressure. The resulting product (b) (750 g.) was a yellowish waxy solid soluble in fatty oils. 100 g. of product (a) together with 40 g. monodiglyceride of tallow fatty acids were dissolved in 10 kg. of a margarine fat mixture as described in Example 1 and the solution was emulsified with 2.5 kg. of an aqueous phase as described in Example 17. The resulting margarine (a) spattered badly and was in general unsatisfactory on frying. 80 g. of product (b) were incorporated in margarine in the same way as described for product (a). The resulting margarine on frying did not spatter and produced a fine sediment not adhering to the frying pan, even after storage for 10 weeks.

Example 20

Citric acid monohydrate (210 g.=1 mole) was added under stirring to molten stearylalcohol (891 g.=3.3 mole) and the mixture heated a temperature of 150° C. under a pressure of 50 mm. Hg. and under stirring for 3 hours. Excess stearylalcohol was removed by washing with ethanol. 500 g. of the reaction product were mixed with 58 g. succinic acid anhydride under stirring at a temperature of 150° C. under normal pressure for 3 hours. The resulting product (540 g.) was a yellowish waxy solid, soluble in fatty oils. 80 g. of this product together with 40 g. monodiglyceride of tallow fatty acids were dissolved in 10 kg. of a margarine fat mixture as described in Example 1 and the solution was emulsified with 2.5 kg. of an aqueous phase as described in Example 17. The resulting margarine had the same excellent properties as that described in Example 19($b$).

Example 21

An isomerized soya bean oil (1000 g.) containing 43% of conjugated doubly unsaturated fatty acid radicals, calculated on the total weight of fatty acid radical present, was reacted with maleic anhydride (200 g., that is 1.4 equivalents per equivalent of conjugated fatty acid radical present) at 140° C. with stirring in a current of carbon dioxide for 2.5 hours. The unreacted maleic acid anhydride was then distilled off in a current of water vapour at 110° C. under a pressure of 12 mm. in half an hour.

The product (1140 g.) consisted of a tasteless, lightly coloured, oily liquid with the viscosity of honey, completely miscible with fatty oils.

1 kg. of this product was dissolved in 600 kg. of a margarine fat mixture consisting of 20% sunflower oil, 40% of palm kernel oil, 30% of hardened whale oil and 10% of palm oil (all these percentages being by weight) and the solution was emulsified with 150 kg. of water, 0.75 kg. of casein, 1.2 kg. of mono-diglyceride, 1.1 kg. of egg-yolk and 0.75 kg. of sodium chloride. The resulting margarine on frying did not spatter and produced a fine sediment not adhering to the frying pan.

Example 22

An isomerized sunflower oil (1000 g.) containing 31% of conjugated doubly unsaturated fatty acid radical (calculated as before) was reacted with maleic acid anhydride (135 g.) under the conditions specified in Example 21, and incorporated in margarine with good results.

Example 23

The product obtained according to Example 21 was reacted with 1-octadecanol (300 g.) at 80° C. with stirring for 1.5 hours. The unreacted alcohol was then distilled off in a current of water vapour at 110° C. under a pressure of 20 mm. The residue (1280 g.) consisted of a clear yellow, oily liquid.

1 kg. of this product was dissolved in 800 kg. of a margarine fat mixture of the composition specified in Example 1 and the solution was emulsified with 40 kg. of acidified skimmed milk, 160 kg. of water, 1.2 kg. of mono-diglyceride, 1.1 kg. of egg-yolk and 0.75 kg. of sodium chloride. The resulting margarine had excellent frying properties even after storage for six months.

Example 24

A mixture of 1000 g. of isomerized soya bean oil containing 43% of conjugated doubly unsaturated fatty acid radicals and 242 g. of maleic acid monoethylester was stirred at 150° C. for 3.5 hours under an atmosphere of carbon dioxide, after which the unreacted ethylester was removed. The product (1190 g.) was incorporated in margarine as described in Example 23 with good results.

Example 25

100 kg. of refined castor oil and 20 kg. maleic acid anhydride were reacted at a temperature of 140° C. during 3 hours under stirring. The unreacted maleic acid anhydride was removed by steam distillation during 1 hour at a temperature of 130° to 140° C. and under a pressure of 15 mm. Hg. Thereafter the reaction mixture was kept at a temperature of 140° to 145° C. for 10 hours under stirring until a refractive index $n_D{}^{25}$ of 1.4837 to 1.4838 (the castor oil used had a refractive index $n_D{}^{25}$ of 1.4770 to 1.4774) was obtained.

The reaction product so obtained was a clear, lightly coloured oily substance of neutral taste with the viscosity of honey. It was miscible with fats and oils in all proportions.

0.6 kg. of this product together with 1.6 kg. monodiglyceride, 0.28 kg. lecithin (containing 55% pure lecithin) and 0.6 kg. benzoic acid were incorporated in 400 kg. of a fatty composition consisting of 20% by weight of groundnut oil, 40% coconut oil, 30% groundnut oil hardened to a melting point of 34° C., 5% palm oil and 5% palm oil hardened to a melting point of 42° C. This mixture was emulsified with an aqueous phase consisting of 20 kg. acidified skim milk, 80 kg. water, 0.4 kg. sodium chloride and 0.4 kg. citric acid to a margarine. This margine on frying did not spatter, gave a fine sediment and an attractive golden-yellow colour. These properties were retained in the margarine for at least 8 to 10 weeks.

Example 26

A mixture of 200 kg. refined castor oil and 800 kg. refined groundnut oil was interesterified for 1.5 hours at a temperature of 110° to 120° C. under a pressure of 20 mm. Hg, and stirring in the presence of 0.2% by weight of sodium methylate. The reaction mixture was washed with water until it was free of alkaline matter and then dried at a temperature of 95° to 100° C. under a pressure of 5 mm. Hg.

The reaction mixture was then mixed with 70 kg. maleic acid anhydride at a temperature of 60° C. heated to a temperature of 140° C. and kept at this temperature for 2.5 hours under stirring. Subsequently the unreacted maleic acid anhydride was removed by steam distillation for about 1 hour at a temperature of 100° to 110° C. and under a pressure of 18 mm. Hg. The resulting product was a clear, lightly coloured and easily flowing oily substance of neutral taste; it was miscible with oils and fats in all proportions.

2 kg. of this product together with 1.6 kg. monodiglyceride, 0.6 kg. benzoic acid and 0.28 kg. lecithin (containing 55% pure lecithin) were dissolved in a mixture of 80 kg. groundnut oil and 320 kg. groundnut oil hardened to a melting point of 30° to 32° C. and the resulting mixture emulsified with an aqueous phase consisting of 25 kg. acidified skim milk, 75 kg. water, 0.4 kg. sodium chloride and 0.4 kg. citric acid to a margarine. This margarine had the same properties as described in Example 25.

Example 27

A mixture of 250 kg. refined castor oil and 1050 kg. refined palm oil was interesterified for 2 hours at a temperature of 100° C. under a pressure of 20 mm. Hg in the presence of 0.3% by weight of potassium glycerate. Subsequently the catalyst was inactivated with an aqueous solution containing 5% by weight of citric acid, the reaction mixture washed with water and dried at a temperature of 100° C. under a pressure of 5 mm. Hg.

1000 kg. of the resulting product was mixed with 100 kg. succinic acid anhydride at a temperature of 100° C. and the mixture heated to 150° C. and kept at this temperature under stirring in an atmosphere of carbon dioxide for 4 hours. The unreacted succinic acid anhydride was subsequently removed by steam distillation during 1 hour at a temperature of 110° C. and under a pressure of 12 mm. Hg.

The resulting product was an oily substance of neutral taste and light-yellow colour; it was miscible with oils and fats in all proportions.

2.4 kg. of this product together with 0.8 kg. monodiglyceride and 0.6 kg. benzoic acid were dissolved in 400 kg. of a fat composition consisting of 16% by weight of soybean oil, 40% coconut oil, 34% cottonseed oil hardened to a melting point of 34° C., 5% palm oil and 5% palm oil hardened to a melting point of 42° C. and the resulting mixture emulsified with an aqueous phase, consisting of 100 kg. water, 0.6 kg. casein, 4 kg. sodium chloride, 0.4 kg. citric acid and 0.4 kg. liquid egg-yolk, to a margarine. This margarine had the same properties as described in Example 25.

The mono-diglyceride mentioned in the Examples 25, 26 and 27 was prepared from tallow.

*Example 28*

50 kg. of fatty acids obtained from castor oil and containing about 140 moles of ricinoleic acid were reacted with 14.7 kg. of maleic anhydride (i.e. about 150 moles) at 120° to 125° C. during 2 to 2.5 hours with stirring. The unreacted maleic acid anhydride was removed by steam distillation during 1 hour at 130° to 140° C. and under a pressure of 15 mm. 50 kg. of fatty acids obtained from castor oil and 200 g. of $SnCl_2.2H_2O$ as an esterification catalyst were then added and the reaction mixture heated to 170° to 180° C. during 3 to 3.5 hours with stirring. Subsequently 38 kg. of n-octadecyl-alcohol (i.e. about 140 moles) and 150 l. of xylene were added and the mixture heated under reflux until esterification was complete and no more water was evolved.

The reaction mixture was then freed from catalyst and xylene and subjected to steam distillation under vacuum in order to remove any free fatty acid present. In this way 132 kg. of an oily reaction product, miscible with oils and fats in all proportions was obtained.

2 kg. of this product together with 1.6 kg. of monodiglyceride of tallow fatty acids and 0.6 kg. of benzoic acid were incorporated in 400 kg. of a fatty composition consisting of 20% groundnut oil, 40% coconut oil, 30% groundnut oil hardened to a melting point of 34° C., 5% palm oil and 5% palm oil hardened to a melting point of 42°C. This mixture was emulsified with an aqueous phase consisting of 20 kg. of acidified skim milk, 80 kg. of water, 0.4 kg. of sodium chloride and 0.4 kg. of citric acid, to a margarine. This margarine on frying did not spatter, gave a fine sediment and an attractive golden-yellow colour. These properties were retained in the margarine for at least 16 weeks.

*Example 29*

100 kg. of refined groundnut oil were epoxidised at a temperature of 40° C. according to the method of W. R. Schmitz, (Journal of the American Oil Chemists' Society, vol. 31, 1954, page 363), and then neutralized and washed first with a solution of potassium bicarbonate and then with water and dried. The epoxidised oil (about 102 kg.) containing 0.23 mole of epoxy-oxygen per 100 g. of oil, was esterified with 400 kg. of groundnut oil in the presence of 0.2% of sodium methylate during 30 minutes at 100° C. and under a pressure of 20 mm. The reaction mixture was then washed free from alkali and dried. About 500 kg. of reaction products containing about 195 moles of epoxy-oxygen was obtained. This was heated with 26 kg. of maleic acid (i.e. 225 moles) at 130° to 140° C. during 2 hours with stirring, after which the unreacted maleic acid was removed by steam distillation during 1 hour at 130° to 140° C. and under a pressure of 15 mm. In this way about 525 kg. of a light coloured oil product, miscible with oils and fats in all proportions was obtained.

1.2 kg. of this product together with 0.8 kg. of monodiglyceride of tallow fatty acids and 0.6 kg. of benzoic acid were incorporated in 400 kg. of a fatty composition consisting of 20% of groundnut oil, 40% coconut oil, 30% groundnut oil hardened to a melting point of 34° C., 5% palm oil and 5% palm oil hardened to a melting point of 42° C. This mixture was emulsified with an aqueous phase consisting of 25 kg. of acidified skimmed milk, 75 kg. of water, 0.4 kg. of sodium chloride and 0.4 kg. of citric acid, to a margarine. This margarine on frying did not spatter, gave a fine sediment and an attractive golden-yellow colour. These properties were retained in the margarine for at least 10 weeks.

What is claimed is:

1. A process for improving foodstuffs comprising emulsions of water and fat which are suitable for frying, which comprises incorporating in the foodstuff a surface-active substance containing carbon, hydrogen and oxygen, any other element present being nitrogen, said substance containing: one to five —CO groups each forming part of a radical selected from the class consisting of —CO.OH and CO.O.CO radicals, not more than three of said radicals being —CO.OH radicals, together with at least one acid radical of an acid selected from the class consisting of aliphatic polycarboxylic acids, aliphatic aminocarboxylic acids and aliphatic hydroxycarboxylic acids, not more than three additional hydrophilic groups, the number of such groups being at most equal to the sum of the carboxyl and any anhydride groups present, and at least two lipophilic groups each containing 6 to 30 carbon atoms and selected from the class consisting of saturated and olefinically unsaturated aliphatic and cycloaliphatic hydrocarbon radicals and heterocyclic radicals containing only carbon and oxygen in the ring, all the carbon-carbon linkages in said compound being present in groups selected from the class consisting of saturated and olefinically unsaturated aliphatic groups and heterocyclic groups containing only carbon and oxygen in the ring, the ratio between the total number of carbon atoms and the sum of the carboxyl groups and any anhydride groups present being at least 40:1 when hydrophilic groups other than carboxyl and anhydride groups are absent and at least 55:1 when such other groups are present, and the molecular weight being not greater than 2000.

2. A process for improving foodstuffs comprising emulsions of water and fat which are suitable for frying, which comprises incorporating in the foodstuff a fatty monoglyceride and a substance the molecule of which contains carbon, hydrogen and oxygen, any other element present being nitrogen, of the general formula:

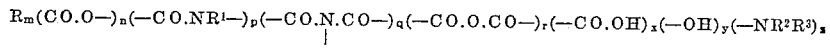

$$R_m(CO.O-)_n(-CO.NR^1-)_p(-CO.N.CO-)_q(-CO.O.CO-)_r(-CO.OH)_x(-OH)_y(-NR^2R^3)_z$$

wherein:

$R_m$ represents $m$ radicals, not all of which are identical, each such radical being selected from the class consisting of aliphatic saturated and olefinically unsaturated hydrocarbon radicals containing 1 to 30 carbon atoms, cycloaliphatic hydrocarbon radicals containing 5 to 30 carbon atoms, and hereto-cyclic radicals containing only carbon and oxygen in the ring and containing in all 4 to 30 carbon atoms, $R^1$, $R^2$ and $R^3$ are selected from the class consisting of hydrogen atoms and monovalent radicals of the kind specified in the definition of $R_m$, $(-CO.NR^1-)_p$ represents $p$ groups, not necessarily all identical, each having the formula $-CO.NR^1-$, $(-NR^2R^3)_z$ represents $z$ groups not necessarily all identical each having the formula —NR²R³, at least two of the radicals R, R¹ and R² contain 6 to 30 carbon atoms, $m = 2$ to 12,
$n = 0$ to 12,
$p = 0$ to 3,
$q = 0$ to 3,
At least one of $n$, $p$ or $q$ is at least one,
$r = 0$ to 2,
$x = 0$ to 1 when $r = 1$ to 2 and $x = 1$ to 3 when $r = 0$,
$y = 0$ to 3,
$z = 0$ to 3, The sum of $y + z$ does not exceed $x + r$,
The ratio of the total number of carbon atoms to $x + r$ is at least 40:1, when $y$ and $z$ are zero and otherwise is at least 55:1, and the molecular weight does not exceed 2000.

3. A process for improving foodstuffs comprising emulsions of water and fat which are suitable for frying, which comprises incorporating in the foodstuff a fatty monoglyceride and a substance of the general formula:

$$R_m(-CO.O-)_n(-CO.OH)_x$$

wherein:
$R_m$ represents $m$ radicals, selected from the class consisting of saturated and olefinically unsaturated aliphatic-hydrocarbon radicals containing up to 30 carbon atoms, cycloaliphatic hydrocarbon radicals containing 5 to 30 carbon atoms, and heterocyclic radicals containing only carbon and oxygen in the ring and containing in all 4 to 30 carbon atoms, wherein:
$m = 2$ to 12,
$n = 1$ to 12,
and $x = 1$ to 3, the ratio between the total number of carbon atoms and the sum of the carboxyl groups and any anhydride groups present being at least 40:1 when hydrophilic groups other than caboxyl and anhydride groups are absent and at least 55:1 when such other groups are present, and the molecular weight being not greater than 2000.

4. A process according to claim 1 for improving foodstuffs comprising emulsions of water and fat which are suitable for frying, which comprises incorporating in the foodstuff a substance of the formula:

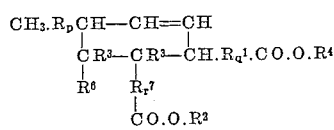

wherein:
R and R¹ are divalent radicals containing up to 24 carbon atoms and selected from the class consisting of hydrocarbon radicals and cycloaliphatic hydrocarbon radicals containing at least 5 carbon atoms,
R² is selected from the class consisting of hydrogen atoms, monovalent aliphatic hydrocarbon radicals containing from 1 to 30 carbon atoms, and cycloaliphatic hydrocarbon radicals containing from 5 to 30 carbon atoms,
R³ is selected from the class consisting of hydrogen atoms and methyl and ethyl radicals,
R⁴ is selected from the class consisting of hydrogen atoms and radicals of the general formula

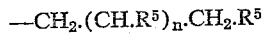

in which $n = 0$ to 16 and R⁵ is selected from the class consisting of hydrogen and monovalent aliphatic carboxylic acid radicals containing 2 to 30 carbon atoms, the R⁵ radicals not necessarily being identical and R² and R⁴ being interchangeable, R⁶ is selected from the class consisting of hydrogen atoms, monovalent aliphatic hydrocarbon radicals containing 1 to 3 carbon atoms and radicals of the formula R².O.CO—,
R⁷ is a divalent aliphatic hydrocarbon radical containing 1 or 2 carbon atoms,
$p$ and $q$ have values selected from the class consisting of 0 and 1 and $r$ is 0 when R⁶ has the formula R².O.CO— and otherwise is one, at least of the radicals R² and R⁴ being hydrogen.

5. A process according to claim 1, characterised in that the substance is a triglyceride, derived from glycerol and fatty acids containing 6 to 30 carbon atoms, at least one of the fatty acid radicals containing a cyclic group formed by addition of a dienophile substance, selected from the class consisting of unsaturated monocarboxylic acids, unsaturated dicarboxylic acids, their anhydrides, esters, amides and ureides, to conjugated double bonds of the fatty acid radical.

6. A process according to claim 1, characterised in that the substance is a triglyceride consisting of an adduct of isomerised soybean oil and a maleic acid half ester.

7. A process according to claim 1, characterised in that the substance is a triglyceride consisting of an adduct of isomerised soybean oil and sorbic acid.

8. A process according to claim 1, characterised in that the substance is a triglyceride in which all the hydroxy groups of the glycerol are esterified with aliphatic monocarboxylic acids containing 6 to 30 carbon atoms, at least one of said acids containing an ester group formed by esterifying a hydroxy group in the acid with a dicarboxylic acid-containing group selected from the class consisting of saturated divalent aliphatic hydrocarbon radicals containing 1 to 8 carbon atoms and unsaturated divalent aliphatic hydrocarbon radicals containing 2 to 8 carbon atoms.

9. A process according to claim 1, characterised in that the substance is a triglyceride consisting of an ester of castor oil and maleic acid.

10. A process according to claim 1, characterised in that the substance is a triglyceride derived from castor oil by interesterification with an oil free from hydroxy fatty acid radicals until the resulting oil predominantly consists of molecules containing one hydroxy fatty acid radical, and esterification of the hydroxy group with maleic acid.

11. A process according to claim 1, characterised in that the substance is glycerol in which one to three hydroxy groups are esterified with substances selected from the class consisting of aliphatic dicarboxylic acids containing 2 to 30 carbon atoms and their aliphatic half esters, and the remaining hydroxy groups are esterified with aliphatic monocarboxylic acids containing 2 to 30 carbon atoms.

12. A process according to claim 1, characterised in that the substance is an N-substituted carboxylic acid amide containing a group selected from the class consisting of aliphatic and cycloaliphatic hydrocarbon groups with 5 to 29 carbon atoms, in which the substituent is derived from a partial ester of a dicarboxylic acid containing a hydrocarbon group with from 1 to 5 carbon atoms, one of which is coupled with the nitrogen atoms.

13. A process according to claim 1, characterised in that the substance is a di-saccharide in which part of the hydroxy groups is esterified with aliphatic monocarboxylic acids containing 2 to 30 carbon atoms, and the remaining hydroxy groups are esterified with substances selected from the class consisting of aliphatic dicarboxylic acids containing from 2 to 30 carbon atoms and their aliphatic half esters.

14. A process according to claim 1, characterised in that the substance is citric acid in which the hydroxy group is esterified with an aliphatic carboxylic acid containing 2 to 30 carbon atoms, and all but one of the carboxylic acid groups are esterified with alcohol selected from the class consisting of aliphatic and cycloaliphatic alcohols containing 6 to 30 carbon atoms.

15. A process according to claim 1, wherein the substance incorporated contains only one carboxyl group, hydroxy groups and at least two lipophilic groups containing 12 to 16 carbon atoms each, and is free from amino and hydroxy groups, the ratio between the total number of carbon atoms and one plus the number of any anhydride groups present being from 45:1 to 80:1 and the molecular weight being 600 to 1600.

16. A process according to claim 1, wherein, with the exception of a single cycloaliphatic group the structure of the substance incorporated is aliphatic.

17. A composition comprising an emulsion of water and fat suitable for frying said emulsion containing a substance characterised in claim 1.

18. A composition comprising an emulsion of water and fat suitable for frying, said emulsion containing a fatty monoglyceride and a substance defined in claim 2.

19. Margarine containing a fatty monoglyceride and a substance defined in claim 2.

20. A composition comprising an emulsion of water and fat suitable for frying, said emulsion containing a fatty monoglyceride and the product obtained by partially esterifying, with octadecanol, the reaction product of maleic anhydride with isomerized soya bean oil.

21. A composition comprising an emulsion of water and fat suitable for frying, said emulsion containing a fatty monoglyceride and a product obtained by esterifying castor oil with maleic anhydride.

22. A composition comprising an emulsion of water and fat suitable for frying, said emulsion containing a fatty monoglyceride and a product obtained by interesterifying castor oil with groundnut oil and reacting the interesterified product with maleic anhydride.

23. A composition comprising an emulsion of water and fat suitable for frying, said emulsion containing a fatty monoglyceride and a product obtained by esterifying an interesterified rapeseed oil containing about 35% diglyceride with sebacic acid.

24. A composition comprising an emulsion of water and fat suitable for frying, said emulsion containing a fatty monoglyceride and a product obtained by esterifying stearyl citric acid with stearoylchloride.

References Cited in the file of this patent

UNITED STATES PATENTS 2,552,706    Bertram  ---------------- May 8, 1951

UNITED STATES PATENT OFFICE
CERTIFICATION OF CORRECTION

Patent No. 3,015,566                                       January 2, 1962

Ewald Georg Becker et al.

It is hereby certified that error appears in the above numbered patent requiring correction and that the said Letters Patent should read as corrected below.

Column 2, line 33, after "30" insert -- carbon --; column 20, line 52, for "mixtures" read -- mixture --; column 22, line 41, strike out "a"; column 28, line 6, for ".0" read -- 0 --; line 60, for "atoms", second occurrence, read -- atom --.

Signed and sealed this 17th day of April 1962.

(SEAL)
Attest:

ESTON G. JOHNSON                                        DAVID L. LADD
Attesting Officer                                          Commissioner of Patents